United States Patent [19]

Kim et al.

[11] Patent Number: 5,834,144
[45] Date of Patent: Nov. 10, 1998

[54] COMPOSITION OF PHOTOCONDUCTIVE LAYER FOR A COLOR DISPLAY PANEL

[75] Inventors: Min Ho Kim; Wan Woo Park, both of Suwon-si, Rep. of Korea

[73] Assignee: Samsung Display Devices Co., Ltd., Suwon-si, Rep. of Korea

[21] Appl. No.: 935,443

[22] Filed: Sep. 23, 1997

[30] Foreign Application Priority Data

Dec. 4, 1996 [KR] Rep. of Korea ............... 1996-61603
Dec. 4, 1996 [KR] Rep. of Korea ............... 1996-61606

[51] Int. Cl.$^6$ ..................................................... G03C 5/00
[52] U.S. Cl. ............................................................... 430/28
[58] Field of Search ..................................... 430/28, 58, 59

[56] References Cited

U.S. PATENT DOCUMENTS 5,004,662  4/1991  Mutoh et al. ........................... 430/72
5,336,577  8/1994  Spiewak et al. ........................ 430/59

FOREIGN PATENT DOCUMENTS 61-233750  10/1986  Japan .
2214866  8/1990  Japan .

*Primary Examiner*—John Goodrow
*Attorney, Agent, or Firm*—Christie, Parker & Hale, LLP

[57] ABSTRACT

Styrene-acrylic copolymer is used as an organic binder, fluorenone derivative is used as an electron receptor and tetraphenylbutadiene derivative is used as an electron donor to produce a color display panel which has a low decomposition temperature, a high electron transferring ability and a charge maintenance ability to manufacture a color display panel without a change of brightness and color coordinates in a fluorescent screen.

6 Claims, 2 Drawing Sheets

COMPOSITION OF PHOTOCONDUCTIVE LAYER FOR A COLOR DISPLAY PANEL

BACKGROUND OF THE INVENTION (a) Field of the Invention

The present invention relates to a photoconductive layer for a color display panel, more specifically, to a composition of a photoconductive layer for a color display panel which comprises a styrene-acrylic copolymer as a organic binder, fluorenone derivative as an electron receptor and tetraphenylbutadiene derivative as an electron donor. This composition has a low decomposition temperature, high electron transferring ability and charge maintenance ability to produce a color display panel without change of brightness and color coordinates in a fluorescent screen.

(b) Description of the Related Arts

A fluorescent layer for a color display panel is manufactured using a spinning method of a slurry coating method. At first, a panel of a glass bulb is spun, a photoresist such as polyvinyl alcohol and ammonium chromate is coated thereon, and the panel is heated and dried. The panel is assembled with a mask assembly to produce a panel-mask assembly and the photoresist thereon is exposed to ultraviolet (uv) rays through a mask slot in the form of a dot or a stripe to stick onto the panel. The assembly is washed with deionized water to remove the photoresist which was not exposed to uv rays, and dried. A space between dots (or stripes) is coated with a nonfluorescent photoabsorbent such as a graphite solution, dried by heating and washed with hydrogen peroxide. The panel is washed by a high pressure spray of distilled water to remove the photoresist and the graphite. The panel was dried by rapidly spinning to form a black matrix. Red, green and blue fluorescent materials were applied between the black matrices to produce a fluorescent layer. There are two methods to apply fluorescent materials to the black matrix, namely a slurry method and an electrophotographic method. The slurry method is carried out as the following. A red fluorescent material slurry is coated on a panel by rapidly spinning the panel at a constant speed. The panel is heated to dry the fluorescent materials and exposed to light using a mask. After exposing, the mask is removed and the fluorescent material which was not exposed light is removed using deionized water to produce red fluorescent material dots or stripes. The same process mentioned above is used to produce green and blue fluorescent material dots or stripes. The final panel is composed of thousands of dots or stripes. The exposure to light is identical with the above process except that the fluorescent material is exposed to light using a light source with a special angle and on the fixed point not to overlap three fluorescent materials. Finally, the fluorescent layer is dried to form a fluorescent screen. The diameter difference of central dot and peripheral dot on the fluorescent layer produced by this method is severe and the form of the dots is distorted to make lower color purity.

The electrophotographic screening process in which the drawback of the above slurry method is eliminated, is described as follows.

A conductive material is coated on an interior surface of a faceplate panel of a color display panel to form a conductive layer and a photoconductive material is overcoated on the conductive layer to form a photoconductive layer. Then, a substantially uniform voltage is applied to the photoconductive layer of the panel and selected areas of the photoconductive layer are exposed to visible light to affect the charge thereon, without affecting the charge on the unexposed area of the photoconductive layer. The fluorescent layer is formed by spraying a fluorescent material powder onto the exposed area of the photoconductive layer.

While the photoconductive layer makes roles of an insulator in the dark, an electrolyte emits electrons or holes in the light source of uv or visible rays.

The structure of a fluorescent layer for a color display panel comprising a photoconductive layer is described in FIGS. 3 and 4. The photoconductive layer comprises an organic conductive layer (13) and a charge originator/charge carrier layer (15) coated on a polymer dispersed charge originator and charge carrier in a color display panel (11) in FIG. 3. Hole or electron carriers such as hydrazone, styryl, pyrazorine, triphenylamine compounds may be added to the polymer. In addition, the photoconductive layer is formed to coat an electron donor (25) on the organic conductive layer (13) and to laminate an electron receptor (27) thereon. The electron donor (25) and electron receptor (27) are dispersed in a binder polymer. The hole or electron carriers such as hydrazone, styryl, pyrazorine, triphenylamine compounds may be added to the polymer as a supporter of charge transport.

A composition of photoconductive layer consist of an organic binder, an electron receptor, an electron donor and a residual solvent. The general organic binders used are polyvinyl cabazole, polymethylmethacylate or polypropylene carbonate. The electron receptors used are hydrazone, styryl, pyrazorine, triphenylamine compounds which have low molecular and conductivity, and are used for copy machines. The corona charge (−) process has to be carried out because these compounds transport holes, which a large amount of ozone is produced. As a method to solve this problem, Japanese laid open Pyung 2-214866, Sho 61-233750 is described trinitrofluorenone (TNF), antraquinone derivative as electron receptors and dimethylphenyl diphenylbutatriene (DMPBT) as electron donors. The above electron receptors and donors are not enough to transport and maintain electron charges and to use with the polymer binder. The imperfect combustion of the photoconductive material coated on a panel occurs in the process for sealing of a panel/funnel at the temperature of 450° C., because the dimethylphenyl diphenylbutatriene decomposes at high temperatures. Accordingly, more than 10% of the photoconductive materials remain thereby decreasing fluorescent brightness and color coordinate for a color display panel.

SUMMARY OF THE INVENTION

Accordingly, the present invention is intended to overcome the above-described disadvantage of conventional arts and to provide a composition of photoconductive layer for a color display panel which has a low decomposition temperature, high electron transferring ability and charge maintenance ability to produce a color display panel without change of brightness and color coordinates in a fluorescent screen.

An embodiment of the present invention provides a composition of photoconductive layer for a color display panel comprising styrene acrylic copolymer as an organic binder expressed as formula 1 below, fluorenone derivative as a electron acceptor expressed as formula 2 below, tetraphenyl butadiene derivative as a electron donor expressed as formula 3 below and solvent.

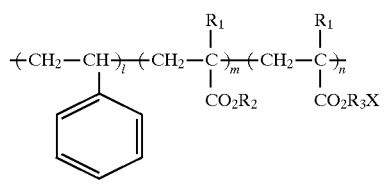

[formula 1]

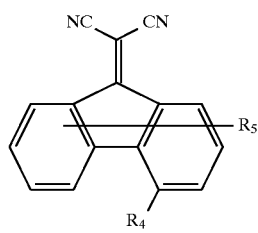

[formula 2]

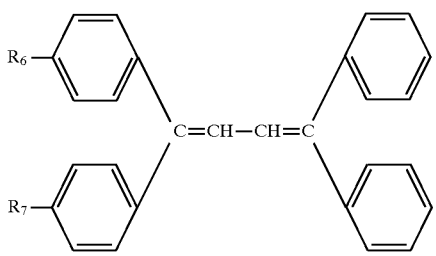

[formula 3]

wherein, $R_1$ and $R_2$ are independently hydrogen or an alkyl group, $R_3$ is an alkyl group or an alkylene group and X is a polar group, and 1, m and n may change for control of the concentration of photoconductive material and surface charge, $R_4$ is one of the carbonyl groups substituted with an alkyl group, an alkoxy group or an aryl group, $R_5$ is selected from the group consisting of hydrogen, halogen, an alkyl group, an alkoxy group, a cyano group, a nitro group, an ester group and a trifluoromethyl group, and $R_6$ is a dimethylamine group or a methoxy group and $R_7$ is hydrogen, a methoxy or dimethylamine group.

The preferred composition comprises of 4–20 weight % of the styrene acrylic copolymer as an organic binder. When below 4 weight % of the organic binder is used in the present invention, the surface voltage is not enough and the thickness of the layer is thin. In addition, when above 20 weight % of the organic binder is used in the present invention, the thickness of the layer is thicker than necessary.

The preferred composition comprises of 0.13–3.2 weight % of fluorenone derivative as an electron donor. When below 0.13 weight % or above 3.2 weight % of the electron donor is used in the invention, the surface voltage drops below 150 V and the surface voltage ratio according to time decreases.

The preferred composition comprises of 0.27–4.98 weight % of tetraphenyl butadiene derivative. When below 0.27 weight % or above 4.98 weight % of the electron donor is used in the invention, the surface voltage ratio according to time drops below 0.7 V.

The preferred solvent is selected from the group consisting of toluene, alcohol and acetone.

The preferred $R_4$ in formula 2 is selected from the group consisting of ethoxycarbonyl, butoxycarbonyl, phenoxycarbonyl, benzyloxycarbonyl, ethylcarbonyl, propylcarbonyl, butylcarbonyl and t-butylcarbonyl.

An embodiment of the present invention provides a fluorenone derivative as an electron acceptor for a photoconductive layer of a color display panel expressed in formula 2.

The preferred $R_4$ in formula 2 is selected from the group consisting of ethoxycarbonyl, butoxycarbonyl, phenoxycarbonyl, benzyloxycarbonyl, ethylcarbonyl, propylcarbonyl, butylcarbonyl and t-butylcarbonyl.

The electron donor and electron receptor are produced as a complex body to have good electron producing ability. The insulating materials with good adherence property and used as electrophotographic fluorescent materials are used as the polymer. For example, polystyrene, polymetacrylate, alpha methylstyrene and copolymer thereof are used. The coating of an organic conductive layer and electron transport material is carried out using spin coating, wirebar coating and roll coating, etc. The thickness of an electron producing layer and a transport layer is below 5 micron as shown in FIG. 3. In FIG. 4, each transport layer is preferred to be below 3 micron.

BRIEF DESCRIPTION OF THE DRAWINGS

The present invention will now be described in greater detail, with relation to the accompanying drawing, in which.

DETAILED DESCRIPTION OF THE EMBODIMENTS

Figure 1:
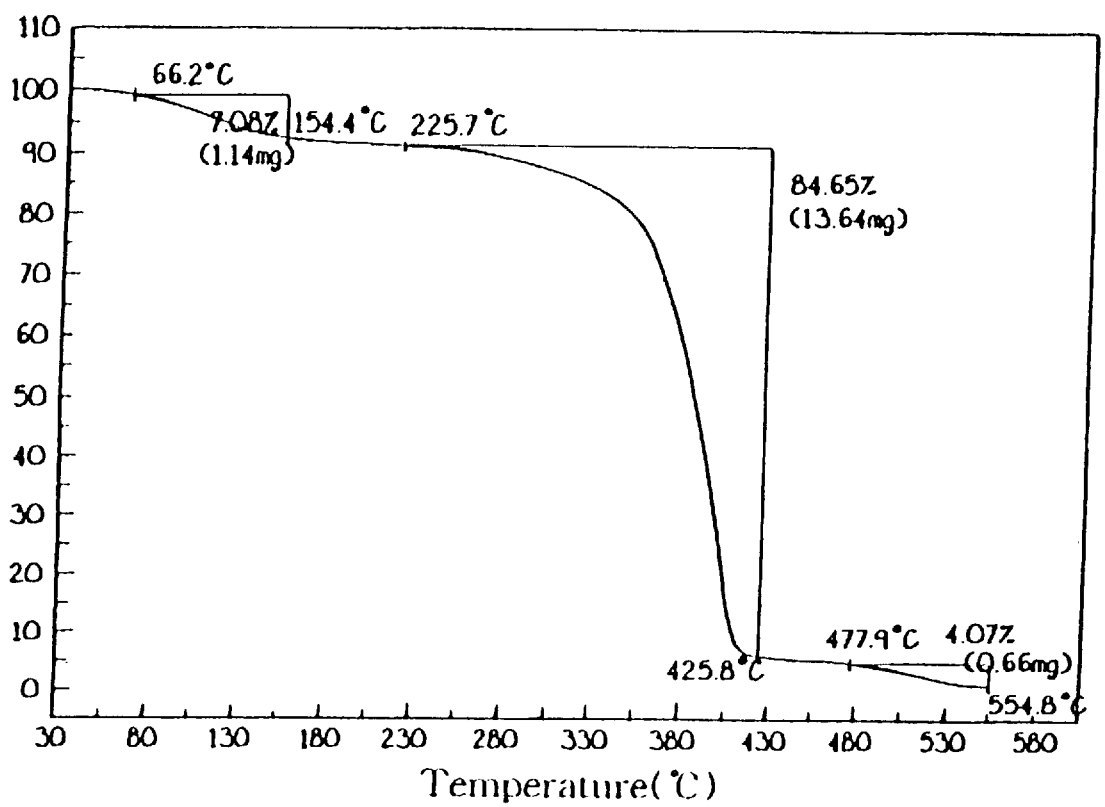
FIG. 1 is a graph illustrating thermal decomposition property according to temperature of a photoconductive composition for a conventional color display panel.

Although the invention has been described with reference to a preferred embodiment it is to be understood that the invention is not limited to the preferred embodiment as herein described.

EXAMPLE 1

5 g (0.022 mol) of 9-fluorenone-4-carboxylic acid and 6.11 g (0.044 mol) of 1-bromobutane were dissolved in 50 ml of dimethylformamide (DMF) and a small amount of $NaHCO_3$ was added to react at 40° C. for 28 hours. The reactant was added to a large amount of distilled water and an organic layer was produced by separation. The organic layer was purified by performing column separation to obtain 5.35 g of 9-fluorenone-4-butyl ester. 5 g (0.018 mol) of 9-fluorenone-4-butyl ester and 0.018 mol of maroonitryl were dissolved in methanol and a small amount of pyperidine was added and stirred for 4 hours. After reaction, the reactant was filtered and the precipitate was recrystallized to produce 4.5 g of fluorenone derivative of formula 2 in which $R_4$ is substituted with a butylester group.

12.3 weight % of styrene acrylic copolymer (SEKISUI CHEMICAL Co. S-LECP) as an organic polymer, 0.95 weight % of di-diethylamine tetraphenyl butadiene as an electron donor and 0.39 weight % of fluorenoen derivative of formula 2 substituted $R_4$ with an ethoxycarbonyl group as an electron receptor were mixed for 5 hours to produce a photoconductive material. The material was spincoated on the organic conductive layer to produce a photoconductive layer to form a fluorescent layer of 4 micron. The photoconductive layer was carried out by corona charging of +40 kV and exposed to light from a high pressure Hg lamp of 400 lux to examine the charge property. After charging the initial surface voltage $V_0$, the ratio of surface voltage change after 1 min $V_1/V_0$, the remaining voltage $V_r$ were measured. $V_0$ was +370 V, the rate of dark decay $V_1/V_0$ was 0.96 and $V_r$ was below 40 V.

EXAMPLE 2

Example 1 was repeated except diethylamine tetraphenylbutadiene was used as an electron donor. The results were similar to the results of example 1.

EXAMPLE 3

Example 1 was repeated except dimethoxy tetraphenylbutadiene was used as an electron donor. The results were similar to the results of example 1.

EXAMPLE 4

Example 1 was repeated except fluorenone derivative of formula 2 substituted $R_4$ with a butoxycarbonyl group as an electron receptor. The results were similar to the results of example 1.

EXAMPLE 5

Example 1 was repeated except fluorenone derivative of formula 2 substituted $R_4$ with a t-butyl group as an electron receptor. The results were similar to the results of example 1.

EXAMPLE 6

Example 1 was repeated except fluorenone derivative of formula 2 substituted $R_4$ with a phenoxycarbonyl group as an electron receptor. The results were similar to the results of example 1.

EXAMPLE 7

Example 1 was repeated except fluorenone derivative of formula 2 substituted $R_4$ with an octylcarbonyl group as an electron receptor. The results were similar to the results of example 1.

EXAMPLE 8

Example 1 was repeated except fluorenone derivative of formula 2 substituted $R_4$ with a butoxycarbonyl group and $R_5$ with a ciano group as an electron receptor. The results were similar to the results of example 1.

EXAMPLE 9

Example 1 was repeated except diethylamine tetraphenylbutadiene was used as an electron donor and fluorenone derivative of formula 2 substituted $R_4$ with a butoxycarbonyl group as an electron receptor. The results were similar to the results of example 1.

EXAMPLE 10

Example 1 was repeated except diethylamine tetraphenylbutadiene was used as an electron donor and fluorenone derivative of formula 2 substituted $R_4$ with a t-butyl group as an electron receptor. The results were similar to the results of example 1.

EXAMPLE 11

Example 1 was repeated except diethylamine tetraphenylbutadiene was used as an electron donor and fluorenone derivative of formula 2 substituted $R_4$ with a phenoxycarbonyl group as an electron receptor. The results were similar to the results of example 1.

EXAMPLE 12

Example 1 was repeated except diethylamine tetraphenylbutadiene was used as an electron donor and fluorenone derivative of formula 2 substituted $R_4$ with an octoxycarbonyl group as an electron receptor. The results were similar to the results of example 1.

EXAMPLE 13

Example 1 was repeated except diethylamine tetraphenylbutadiene was used as an electron donor and fluorenone derivative of formula 2 substituted $R_4$ with a t-butyl group and $R_5$ with a ciano group as an electron receptor. The results were similar to the results of example 1.

EXAMPLE 14

Example 1 was repeated except diethylamine tetraphenylbutadiene was used as an electron donor and fluorenone derivative of formula 2 substituted $R_4$ with a butoxycarbonyl group as an electron receptor. The results were similar to the results of example 1.

EXAMPLE 15

Example 1 was repeated except dimethoxy tetraphenylbutadiene was used as an electron donor and fluorenone derivative of formula 2 substituted $R_4$ with a t-butyl group as an electron receptor. The results were similar to the results of example 1.

EXAMPLE 16

Example 1 was repeated except dimethoxy tetraphenylbutadiene was used as an electron donor and fluorenone derivative of formula 2 substituted $R_4$ with a phenoxycarbonyl group as an electron receptor. The results were similar to the results of example 1.

EXAMPLE 17

Example 1 was repeated except dimethoxy tetraphenylbutadiene was used as an electron donor and fluorenone derivative of formula 2 substituted $R_4$ with an octoxycarbonyl group as an electron receptor. The results were similar to the results of example 1.

EXAMPLE 18

Example 1 was repeated except dimethoxy tetraphenylbutadiene was used as an electron donor and fluorenone derivative of formula 2 substituted $R_4$ with a t-butyl group and $R_5$ with a ciano group as an electron receptor. The results were similar to the results of example 1.

COMPARATIVE EXAMPLE

Example 1 was repeated except 10.5 weight % of polypropylene was used as an organic binder, 0.42 weight % of trinitrofluorenone was used an electron receptor and 1.5 weight % of dimethylphenyl diphenylbutadiene was used as an electron donor. The results were similar to the results of example 1.

The weight change of photoconductive layers produced in example 1 to example 18 and comparative example were measured by using a DT/TGA machine while increasing the temperature to 500° C. at the speed of 10° C./min. The results thereof are shown in table 1 below.

TABLE 1

| | initial surface voltage $V_0$(V) | rate of dark decay $V_1/V_0$ (V) | remaining voltage Vr (V) |
|---|---|---|---|
| EXAMPLE 1 | +370 | 0.96 | 40 |
| EXAMPLE 2 | 398 | 0.97 | 21 |
| EXAMPLE 3 | 412 | 0.96 | 19 |
| EXAMPLE 4 | 395 | 0.95 | 17 |
| EXAMPLE 5 | 560 | 0.98 | 25 |
| EXAMPLE 6 | 575 | 0.96 | 20 |
| EXAMPLE 7 | 470 | 0.95 | 30 |
| EXAMPLE 8 | 420 | 0.95 | 25 |
| EXAMPLE 9 | 380 | 0.94 | 18 |
| EXAMPLE 10 | 446 | 0.97 | 15 |
| EXAMPLE 11 | 400 | 0.95 | 20 |
| EXAMPLE 12 | 425 | 0.96 | 10 |
| EXAMPLE 13 | 415 | 0.97 | 15 |
| EXAMPLE 14 | 380 | 0.98 | 17 |
| EXAMPLE 15 | 420 | 0.95 | 20 |
| EXAMPLE 16 | 435 | 0.94 | 25 |
| EXAMPLE 17 | 440 | 0.95 | 20 |
| EXAMPLE 18 | 450 | 0.96 | 20 |
| COMPARATIVE EXAMPLE | 350 | 0.91 | 40 |

Figure 2:
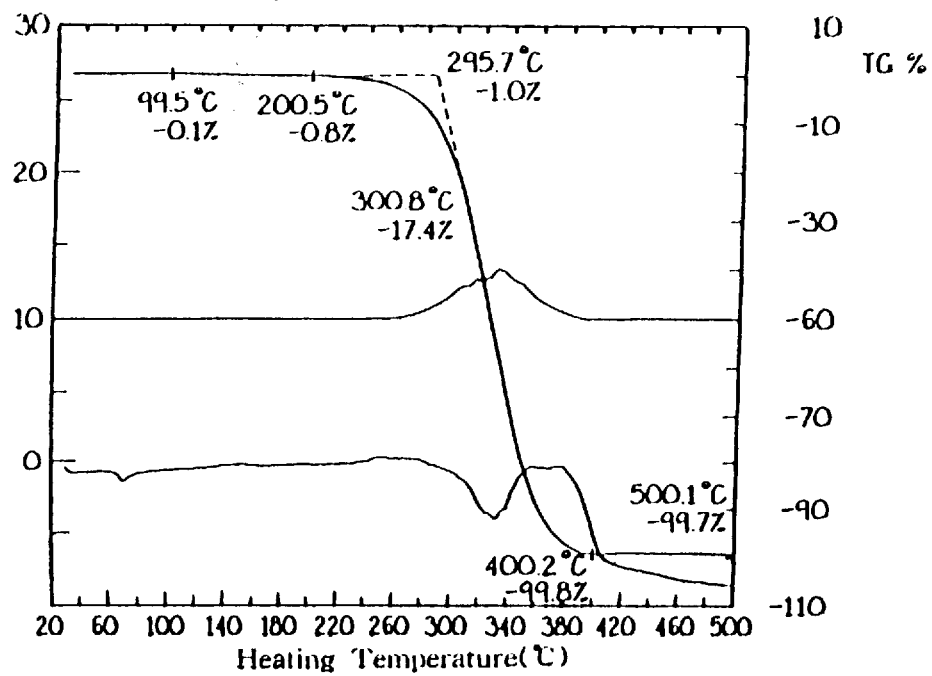
FIG. 2 is a graph illustrating thermal decomposition property according to temperature of a photoconductive composition for a display panel of the present invention.
Figure 3:
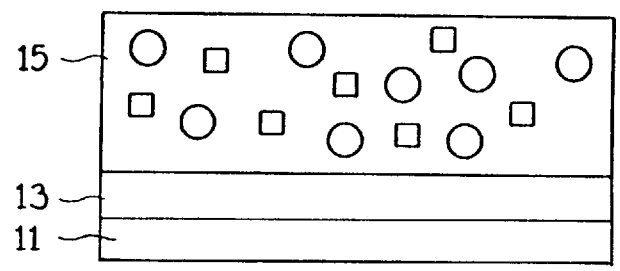
FIG. 3 is a cross-sectional view of a photoconductive layer for a color display panel.
Figure 4:
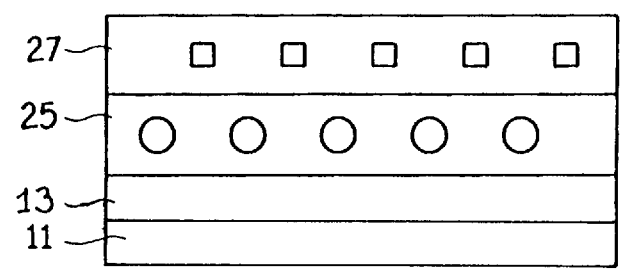
FIG. 4 is a cross-sectional view of a photoconductive layer for a color display panel.

The thermal decomposition property of photoconductive composition of the above examples had lower decomposition temperatures and was 99.8% decomposed as compared to that of the conventional photoconductive composition. This fact is shown in FIGS. 1 and 2.

The photoconductive composition for a color display panel according to the present invention has a low decomposition temperature and an excellent thermal decomposition property. Therefore, an organic material did not remained to have no change of brightness of the fluorescent screen and color coordinate. Especially, while TNF was not used because it is known to be a carcinogen and pollutant, the fluorenone derivative and the tetraphenyl butadiene derivative in the photoconductive composition according to the present invention has no environmental problems.

What is claimed is:

1. A composition of a photoconductive layer for a color display panel comprising:

styrene acrylic copolymer as an organic binder expressed as formula 1 below;

fluorenone derivative as an electron acceptor expressed as formula 2 below;

tetraphenyl butadiene derivative as an electron donor expressed as formula 3 below; and a solvent

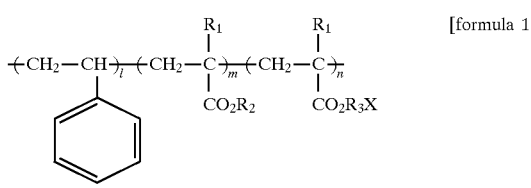

[formula 1]

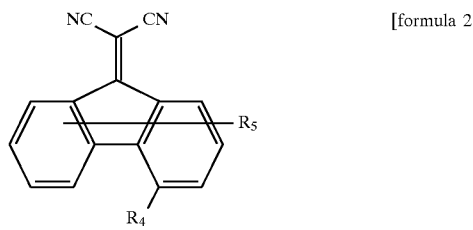

[formula 2]

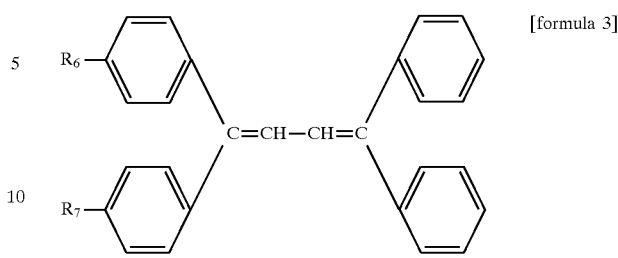

[formula 3]

wherein, $R_1$ and $R_2$ are independently hydrogen or an alkyl group, $R_3$ is an alkyl group or an alkylene group and X is a polar group, and l, m and n may change for control of the concentration of a photoconductive material and surface charge, $R_4$ is a carbonyl group substituted with an alkyl group, an alkoxy group or an aryl group, $R_5$ is selected from the group consisting of hydrogen, halogen, alkyl group, alkoxy group, cyano group, nitro group, ester group and trifluoromethyl group, and $R_6$ is a dimethylamine group or a methoxy group and $R_7$ is hydrogen, a methoxy or dimethylamine group.

2. The composition of a photoconductive layer for a color display panel of claim 1, wherein said composition comprises 4–20 weight % of said styrene acrylic copolymer, 0.13–3.2 weight % of said fluorenone derivative and 0.27–4.98 weight % of said tetraphenyl butadiene derivative.

3. The composition of a photoconductive layer for a color display panel of claim 1, wherein said solvent is selected from the group consisting of toluene, alcohol and acetone.

4. The composition of a photoconductive layer for a color display panel of claim 1, wherein said $R_4$ in said formula 2 is selected from the group consisting of ethoxycarbonyl group, butoxycarbonyl group, phenoxycarbonyl group, benzyloxycarbonyl group, ethylcarbonyl group, propylcarbonyl group, butylcarbonyl group and t-butylcarbonyl group.

5. A fluorenone derivative as an electron acceptor for a photoconductive layer of a color display panel expressed as formula 2.

6. The fluorenone derivative as an electron acceptor for a photoconductive layer of color display panel of claim 5, wherein $R_4$ in said formula 2 is selected from the group consisting of ethoxycarbonyl group, butoxycarbonyl group, phenoxycarbonyl group, benzyloxycarbonyl group, ethylcarbonyl group, propylcarbonyl group, butylcarbonyl group and t-butylcarbonyl group.

* * * * *